United States Patent Office 2,810,677
Patented Oct. 22, 1957

2,810,677

RECOVERY AND PURIFICATION OF ENZYMES

John S. Gilkison, Chicago, and Earl R. Kooi, La Grange, Ill., assignors to Corn Products Refining Company, New York, N. Y., a corporation of New Jersey No Drawing. Application June 24, 1955,
Serial No. 517,912

8 Claims. (Cl. 195—66)

This invention relates to the recovery and purification of enzymes, such as dextran-dextrinase, fungal and bacterial amylases, and the like.

Frequently, it is desirable to separate an enzyme from the substrate on which it was grown since the by-products therein interfere with later use of the enzyme, or to separate the enzyme from other materials present in a solution containing the enzyme.

The materials present in a solution containing the enzyme may be undesirable because of deleterious effect on enzyme action, or because of interference of these materials with the recovery or the purity of the product of enzyme action. In other cases, it may be desirable to separate from the enzyme a valuable by-product. In other instances, it may be desirable to separate an enzyme from a solution containing a mixture of enzymes.

For example, if the enzyme dextran-dextrinase is prepared by growth of a suitable organism on a medium containing carbohydrate material and a proteinaceous material, there is present in the final solution, besides the enzyme, gluconic acid, proteinaceous material, and residual carbohydrate. If this solution is then used for the conversion of partially hydrolyzed amylaceous material to dextran, recovery of the dextran is complicated by the necessity for separation of the dextran from these other materials. In this case, it is desirable to separate the dextran-dextrinase from the gluconic acid, proteinaceous material, and residual carbohydrate prior to the enzymatic conversion of the partially hydrolyzed amylaceous material to dextran.

Another example where separation of an enzyme is desirable is in the case in which the enzyme dextran-dextrinase is prepared by growth of a suitable organism on a polyhydric alcohol in accordance with the claims of co-pending application No. 517,913, filed June 24, 1955, and it is desirable to recover the ketose by-product without destroying the dextran-dextrinase activity contained in the solution.

Yet another example is in the case of solutions containing fungal amylase enzyme mixtures, where it is desirable to separate from impurities and other enzymes, the alpha-amylase present.

Previous methods used for such enzyme separations include precipitation of the enzyme by adding large quantities of ammonium sulfate, or by adding large quantities of a water-miscible organic liquid. In the case of ammonium sulfate, the process is expensive and impractical for commercial practice. In the case of the organic liquids, it is usually necessary to add sufficient amount to obtain a concentration of the organic liquid of 50 to 80 percent by volume. Not only is this expensive, but considerable destruction of the desired enzyme usually occurs, particularly if the temperature is not maintained in the neighborhood of 0 to 10 degrees C.

The main object of this invention is to provide a novel and improved method of separating certain enzymes from solutions thereof or from substrates on which they are formed. Other objects will appear hereinafter.

We have discovered that, in the presence of dextran, enzymes, such as dextran-dextrinase and fungal or bacterial alpha-amylases and the like, can be readily separated from other materials or other enzymes by precipitating them with organic liquids miscible with water, e. g., acetone, alcohol, and separating the precipitate. The presence of dextran makes it possible to precipitate the enzyme at low concentration of the organic liquid in contrast to the use of the organic liquid alone.

The amount of dextran which should be present in the system in order to effect the desired precipitation should be at least about 0.04 gram per 100 ml. of substrate. More than 1.0 gram of dextran per 100 ml. is not detrimental but gives no added advantage over 1.0 gram.

The organic liquid may be any one which is miscible with water to the extent of at least 30 percent by volume. The preferred liquid is acetone but ethanol, methanol, 1-propanol, 2-propanol, 2-butoxyethanol, and 4-hydroxy-4-methyl-2-pentanone are also satisfactory. The amount of liquid is governed by the amount necessary to precipitate the dextran present and may be 25 percent of the system or greater but 25 to 50 percent is the preferred range. Above about 70 percent of the system is not desirable as the enzyme will be partially destroyed and the yield lowered.

The following examples which are typical and informative only and not limiting in any sense will further illustrate the invention.

EXAMPLE I

Dextran-dextrinase enzyme was produced by fermentation of (1) a 17 D. E. acid hydrolyzate of starch, (2) sorbitol, and (3) glucose as follows: Media composed of 0.5 gram of yeast extract per 100 ml. of water containing 4 grams of starch hydrolyzate, 2 grams of sorbitol, and 0.5 gram of glucose, respectively, were sterilized, the pH levels thereof adjusted to 6.0, and inoculated with 10 percent by volume of a culture of *Acetobacter capsulatum* and incubated for 16 hours in shaken flasks. *Acetobacter capsulatum* produces dextran-dextrinase on all these media but dextran is produced only in the medium containing starch hydrolyzate. To the culture liquors at pH 4.5 were added various amounts of acetone. The acetone precipitate was dissolved in water, readjusted to pH 4.5, and dextran-dextrinase activity determined. From the results, as shown in Table I, it is evident that (1) when the enzyme production substrate contains materials from which dextran is formed, the dextran-dextrinase activity is precipitated at very low solvent concentrations in comparision with the solvent concentrations usually required for enzyme precipitation, (2) when the enzyme production substrate does not contain materials from which dextran is formed, the dextran-dextrinase enzyme is not precipitated at low solvent concentrations, and (3) when the enzyme production substrate does not contain materials from which dextran is formed but dextran is added thereto, the dextran-dextrinase activities is precipitated at low solvent concentrations. In brief, it is shown that the presence of dextran is essential to the precipitation of dextran-dextrinase at low solvent concentrations.

*Table I*

| Acetone Concn., Percent by Volume | Enzyme Production Substrate | | | |
|---|---|---|---|---|
| | 17 D. E. Acid Hydrolyzate of Corn Starch | Sorbitol | Dextrose | Sorbitol (Dextran Added) |
| | Percent of Dextran-Dextrinase Precipitated | | | |
| 0 | 0 | | | 0 |
| 26 | 0 | | | |
| 28 | 100 | | | |
| 30 | 100 | 0 | 0 | 94 |
| 40 | 98 | | | |
| 45 | 78 | | | |
| 50 | 74 | 0 | 0 | 86 |
| 60 | 74 | | | |
| 70 | ¹ 11 | | | |
| 75 | ¹ 12 | | | |

¹ Low values are obtained at high solvent concentrations not because the enzyme is not precipitated but because its activity is partially destroyed under such conditions.

EXAMPLE II

Dextran-dextrinase enzyme was produced by fermentation of a 17 D. E. acid hydrolyzate of starch as described above. The fermentation liquor was adjusted to pH 4.5. To separate portions of the liquor was added various amounts of acetone. After removal by centrifugation, the precipitates were suspended in water and adjusted to pH 4.5, and dextran-dextrinase activity was determined. Results of this experiment (Table II) show that (1) at solvent concentrations at which dextran is not precipitated, dextran-dextrinase is not precipitated, (2) at solvent concentrations at which dextran is only partially precipitated, dextran-dextrinase is partially precipitated, and (3) at solvent concentrations at which dextran is completely precipitated, dextran-dextrinase is likewise completely precipitated. In brief, the minimum solvent concentration necessary to completely precipitate dextran-dextrinase in the presence of dextran is the minimum solvent concentration which effects complete precipitation of the dextran.

*Table II*

| Acetone Concentration, Percent By Volume | Dextran Precipitated, Percent | Dextran-Dextrinase Precipitated, Percent |
|---|---|---|
| 25.0 | 0 | 0 |
| 26.0 | 0 | 0 |
| 27.0 | 50 | 54 |
| 28.0 | 100 | 100 |
| 29.0 | 100 | 90 |
| 30.0 | 100 | 94 |

EXAMPLE III

Dextran-dextrinase enzyme was produced by fermentation of a sorbitol medium as described above. To separate portions of the fermentation liquor were added various amounts of dextran. The liquors were brought to 30 percent acetone by volume. The resultant precipitates were separated by centrifugation, resuspended in water, and the dextran-dextrinase activity determined. Table III shows the concentrations of dextran required for precipitation of the dextran-dextrinase enzyme under these conditions.

*Table III*

PRECIPITATION OF DEXTRAN-DEXTRINASE IN THE PRESENCE OF DEXTRAN

| Dextran Added, Grams per 100 ml. | Dextran-Dextrinase Activity Recovered, Percent |
|---|---|
| 0.04 | 78 |
| 0.16 | 94 |
| 0.40 | 100 |
| 1.00 | 96 |

EXAMPLE IV

A medium containing 0.5 gram of yeast extract and 5 grams of sorbitol per 100 ml. was adjusted to pH 5.0, sterilized, and inoculated with a culture of Acetobacter capsulatum. After 16 hours' incubation at 30° C. with constant agitation and aeration, a total of 0.5 gram dextran per 100 ml. was added. To the mixture was added sufficient acetone to give a concentration of 30 percent, by volume. The precipitate was removed by centrifugation. The supernatant liquor contained an amount of sorbose equal to 90 percent, by weight, of the sorbitol added. The precipitate was redissolved in water equal to the original volume of the culture medium. The resulting solution was adjusted to pH 4.5, and 1 percent by volume of toluene, and 15 grams, dry substance, of a 17 D. E. acid hydrolyzate of corn starch was added. After incubation at 30° C. for 48 hours, the liquor was brought to 30 percent acetone, by volume. The precipitate after drying contained essentially pure dextran equal to 35 percent by weight of the hydrolyzate dry substance and the supernatant liquor contained essentially pure soluble starch-like carbohydrate equal to 65 percent by weight of the hydrolyzate dry substance.

EXAMPLE V

A medium containing 0.5 gram of yeast extract and 4 grams dry substance of a 17 D. E. acid hydrolyzate of corn starch per 100 ml. was adjusted to pH 6.0, sterilized, and inoculated with a culture of Acetobacter capsulatum. After 16 hours' incubation at 30° C. with constant agitation and aeration, the liquor was adjusted to pH 4.5 and sufficient acetone was added to give a concentration of 30 percent by volume. The precipitate was removed by centrifugation. The supernatant liquor contained a mixture of soluble starch-like carbohydrate and gluconic acid. The precipitate was added to a 15 percent solution of a 17 D. E. acid hydrolzate of corn starch at pH 4.5 containing 1 percent toluene, by volume. After incubation at 30° C. for 72 hours, the liquor was brought to 30 percent acetone, by volume. The precipitate after drying contained essentially pure dextran equal to 35 percent by weight of the hydrolyzate dry substance and the supernatant liquor contained essentially pure soluble starch-like carbohydrate equal to 65 percent by weight of the hydrolyzate dry substance.

EXAMPLE VI

A one percent solution of a fungal amylase, sold under the trademark Rhozyme S, in a 0.2 molar acetate buffer was treated with various quantities of acetone in the presence and absence of 0.5 gram of dextran per 100 ml. of solution. The precipitates were separated by centrifugation and dissolved and diluted to the original volume with the acetate buffer.

The enzyme activity of the resulting solutions was determined by 24 hour conversions at 45° C. of a starch hydrolyzate having a D. E. value of 18. The results are shown in Table IV.

Table IV

| Acetone concentration, Percent by volume | 30 | 50 | 70 |
|---|---|---|---|
| Dextran added, g./100 ml. | Recovery of activity in acetone precipitate, Percent of original activity | | |
| 0 | 6 | 10 | 35 |
| 0.5 | 15 | 75 | 55 |

EXAMPLE VII

One percent solutions of a fungal amylase sold under the trademark Rhozyme S, and of a bacterial alpha-amylase sold under the trademark Rhozyme H-39, in 0.05 molar acetate buffer were treated with various quantities of acetone in the presence and absence of 0.5 gram of dextran per 100 ml. of solution. The precipitates were separated by centrifugation and dissolved and diluted to the original volume with acetate buffer.

The redissolved precipitates were tested for total saccharifying activity as measured by production of reducing sugars from a 17 D. E. starch hydrolyzate, for glucogenic activity as measured by production of glucose from a 17 D. E. starch hydrolyzate, and for alpha-amylase activity as measured by conversion of soluble starch. The results shown in Table V show that fungal alpha-amylase is preferentially precipitated and separated from the glucogenic enzyme at low acetone concentrations in the presence of dextran, and that bacterial alpha-amylase is likewise precipitated at low acetone concentrations in the presence of dextran.

Table V

| Acetone Concentration, Percent by Volume | Dextran Added, g./100 ml. | Recovery of Activity in Acetone Precipitate, Percent of Original Activity | | |
|---|---|---|---|---|
| | | Total Saccharifying Activity | Glucogenic Activity | Alpha-Amylase Activity |
| Rhozyme S | | | | |
| 35 | 0 | 5 | 0 | 5 |
| 35 | 0.5 | 56 | 7 | 100 |
| 50 | 0 | 51 | 21 | 94 |
| 50 | 0.5 | 88 | 69 | 100 |
| Rhozyme H-39 | | | | |
| 35 | 0 | | | 9 |
| 35 | 0.5 | | | 100 |
| 50 | 0 | | | 72 |
| 50 | 0.5 | | | 72 |

We claim:
1. A process of recovering an enzyme selected from the group consisting of dextran-dextrinase, fungal alpha-amylases and bacterial alpha-amylases from solutions thereof which comprises precipitating the enzymes in the presence of dextran, adding to the solution about 25 percent to about 70 percent by volume of an organic solvent miscible with water to the extent of at least about 30 percent, and separating the precipitated enzymes.

2. A process according to claim 1 wherein the dextran is present in the amount of at least about 0.04 gram of dextran per 100 ml. of solution.

3. A process according to claim 1 wherein the organic solvent is acetone.

4. A process according to claim 1 wherein the organic solvent is ethanol.

5. A process according to claim 1 wherein the organic solvent is methanol.

6. A process according to claim 1 wherein the organic solvent is propanol-2.

7. A process according to claim 1 wherein the organic solvent is 4-hydroxy-4-methyl-2-pentanone.

8. A process of recovering an enzyme from the group consisting of dextran-dextrinase, fungal alpha-amylases and bacterial alpha-amylases from solutions thereof which comprises adding to the solution at least about 0.04 gram of dextran per 100 ml. of solution and about 25 percent to about 70 percent by volume of an organic solvent miscible with water to the extent of at least about 30 percent, and separating the precipitated enzymes.

References Cited in the file of this patent

"Proc. Soc. Expt'l. Biol. and Med.," vol. 71, 1949, pages 336 to 339. "Acta Chemica Scandinavica," 3, 1949, by E. Hultin et al., pages 1405 to 1417.

"Chemistry and Methods of Enzymes," 1953, by J. Sumner et al., pub. by Academic Press Inc. (New York), page 57.

"Jour. of Biol. Chem.," vol. 200, No. 2, February 1953, pages 793 and 794.

"Advances in Enzymology," vol. 14, 1953, pub. by Interscience Pub. Inc. (N. Y.), pages 341, 343.